(No Model.)
C. O. METZLER.
HUB.
No. 546,072. Patented Sept. 10, 1895.
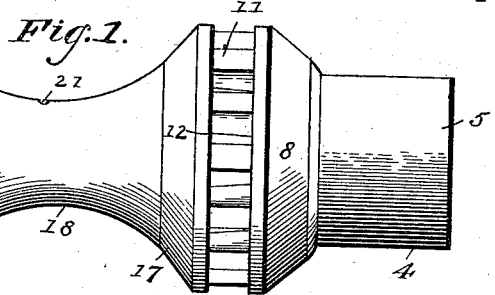
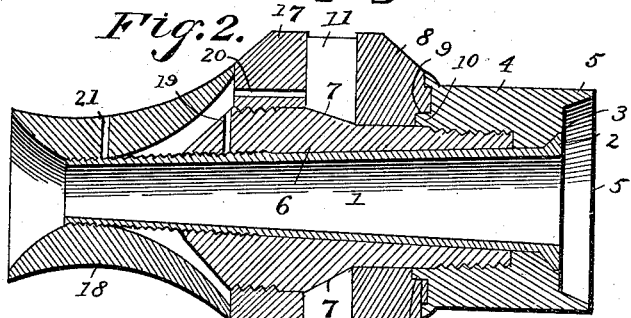
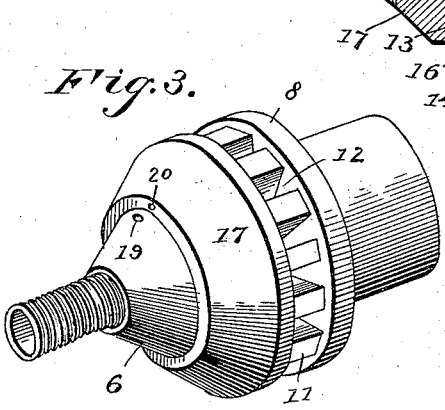
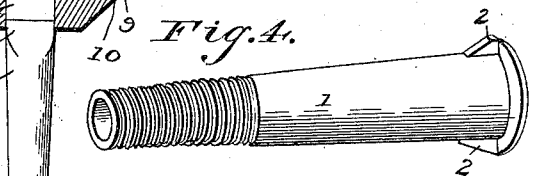
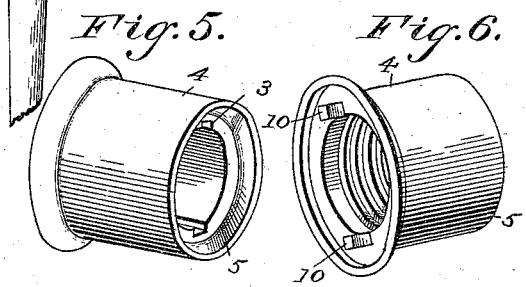
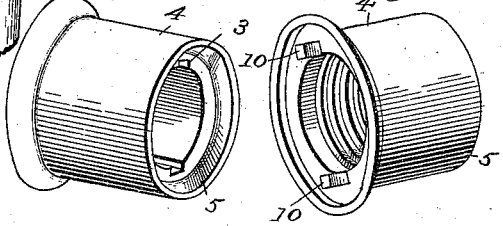
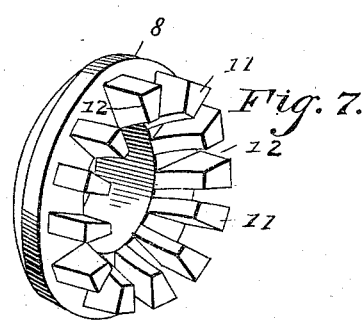
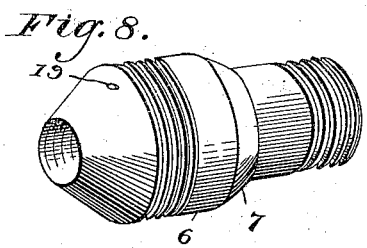
Witnesses
Inventor
Chas. O. Metzler,
By his Attorneys.

UNITED STATES PATENT OFFICE.

CHARLES O. METZLER, OF HOLDEN, MISSOURI.

HUB.

SPECIFICATION forming part of Letters Patent No. 546,072, dated September 10, 1895.

Application filed May 19, 1894. Serial No. 511,846. (No model.)

*To all whom it may concern:*

Be it known that I, CHARLES O. METZLER, a citizen of the United States, residing at Holden, in the county of Johnson and State of Missouri, have invented a new and useful Hub, of which the following is a specification.

My invention relates to hubs for vehicle-wheels, and has for its object to provide a sectional hub so constructed as to facilitate the adjustment of the spokes to take up lost motion due to shrinkage, wear, &c., and, furthermore, to provide means for securing the boxing in the shell of the hub and tightening the same by the same movement necessary to expand or tighten the spokes.

Further objects and advantages of the invention will appear in the following description, and the novel features thereof will be particularly pointed out in the claims.

In the drawings, Figure 1 is a side view of a hub embodying my invention. Fig. 2 is a central longitudinal section of the same. Fig. 3 is a perspective view with the guard omitted. Fig. 4 is a detail view of the boxing. Fig. 5 is a similar view of the inner or guard section of the casing. Fig. 6 is a similar view of the same part, showing the inner end thereof. Fig. 7 is a similar view of the socket-ring. Fig. 8 is a similar view of the expanding cone.

Similar numerals of reference indicate corresponding parts in all the figures of the drawings.

1 designates the boxing, which is preferably tapered toward its outer end, and is provided at its inner end with lateral projections 2, engaging notches or depressions 3 in the inner end of the guard-section 4 of the casing to prevent independent movement of the boxing and casing when the members comprising the hub are tightened. The part 4 is provided at its inner end with a mud guard or flange 5. Fitted upon the boxing and threaded at its inner end into the bore of the member 4 is an expanding cone 6, and fitted upon this cone adjacent to the tapered shoulder 7 thereof and in contact with the outer end of the member 4 is a socket-ring 8, provided in its inner side with notches or depressions 9 for the reception of projections 10 on the outer end of the part 4, whereby said parts 4 and 8, which combine to form the main portion of the casing or shell of the hub, are held from independent movement, and may be turned simultaneously in the operation of adjusting the spokes. The outer side of the socket-ring is provided with a series of radial ears 11, forming intermediate sockets 12 for the reception of the inner reduced ends 13 of the spokes 14. The outer edges of these ears are set back from the periphery of the socket-ring or terminate short of the periphery of said socket-ring, and the spokes are provided upon opposite sides of their reduced inner ends with shoulders 16, to bear upon the outer ends of the ears.

Threaded upon the enlarged outer end of the cone is an annular washer 17, which is adapted when in place to close the outer sides of the spoke-sockets and the shouldered portions of the spokes between the contiguous surfaces of the socket-ring and this annular washer, as clearly shown in Fig. 2. The bore of the expanding cone is tapered to agree with the shape of the boxing, and the outer portion of this bore is threaded to engage corresponding threads formed upon the outer surface of the boxing adjacent to its outer or reduced end, and threaded upon the outer portion of the boxing, which projects beyond the extremity of the expanding cone, is a guard 18, having a hollow or bell-shaped inner end to receive and fit over the outer end of the cone and bear at its edge against the outer surface of the annular washer. The outer end of this guard is similarly flared to give an ornamental appearance to the outer end of the hub and also to provide the usual space for the application of the nut, (not shown,) whereby the wheel is secured to the spindle of the axle.

To assemble the parts of a wheel of which the improved hub is to form a part, engage the outer ends of the spokes in their sockets in the rim, thus disposing the inner ends of the spokes in a circle, the diameter of the circle described by the shoulder 16 of the spokes being less than the diameter of the circle described by the outer sides or edges of the ears 11 of the socket-ring. The end of the guard-section 4 is then engaged with the inner side of the socket-ring 8, and the ears 11 of the latter are arranged in contact with the inner surfaces of the spokes, after which the cone is inserted through the socket-ring and the threads at its inner end are engaged with the interior threads of the guard-section 4. This causes the inner ends of the spokes to bear against the surface of the reduced portion of the cone. The cone is then turned into the guard-section until its inclined surface is in contact with the ends of the spokes, after which the washer 17 is threaded upon the exterior surface of the enlarged portion of the cone and is turned until its inner surface bears against the outer surfaces of the spokes. The boxing is then inserted from the inside through the guard-section and the cone until the threads at its outer or smaller end engage the threads on the inner surface of the cone and the boxing is turned to feed into the cone until the projections 2 at its inner end come in contact with the outer end of the guard-section 4. The shoulder of the boxing still lacks approximately half an inch of being in contact with the outer end of the section 4. Assuming, now, that the threads on the inner end of the cone and on the inner surface of the guard-section are twenty-four to the inch while the threads on the boxing and those with which they engage at the outer end of the cone are sixteen to the inch, it will be seen that when the projections 2 are aligned with the notches or depressions 3 in the inner end of the guard-section and the cone is turned to screw into the guard-section and at the same time screw inward upon the boxing the different pitch of the threads connecting the cone with the boxing from those connecting the cone with the guard-section will, with the same number of revolutions of the cone, cause the cone to move a greater distance upon the boxing than it moves into the guard-section. Hence the boxing will be moved outward with relation to the guard-section and the shoulder of the boxing will be drawn firmly against the inner end of said section. This adjustment of the cone causes the expansion of the rim by separating the inner ends of the spokes, which are forced apart by the conical surface of the cone, and when the cone reaches its proper position upon the boxing and the shoulder of the boxing is in contact with the inner end of the guard-section the shoulders 16 of the spokes describe a circle of equal diameter with the outer sides of the ears 11, and therefore by turning the washer 17 the inner ends of the spokes may be forced into the sockets 12 and firmly secured in place. In order to secure a greater or less expansion of the rim the cone may be screwed more or less into the guard-section before the boxing is inserted. It will be seen that the annular washer is provided with a perforation 20, and the guard is provided with a similar perforation 21 for the engagement of a wrench in turning them to place.

Various changes in the form, proportion, and the minor details of construction may be resorted to without departing from the spirit of the invention or sacrificing any of the advantages thereof.

Having described my invention, what I claim is—

1. The combination with a boxing provided at its inner end with projections, of a casing or shell fitted upon the inner end of the boxing, provided with a socket-ring, and having depressions to receive the projections on the boxing, an expanding-cone fitted upon the boxing, threaded at its inner end into the bore of the casing or shell, and provided at the outer end of its bore with threads to engage threads upon the boxing, the pitch of the threads in the bore of the cone and the corresponding threads upon the boxing with which they engage being greater than that of the threads upon the inner end of the cone which engage the bore of the casing, spokes fitted in the sockets of the socket-ring, and a washer threaded upon the enlarged portion of the cone and closing the outer sides of the sockets, substantially as specified.

2. The combination of a boxing provided at its inner end with projections 2 and at its outer end with exterior screw threads, a sectional shell or casing comprising a guard section 4 and a socket ring 8 connected at their contiguous ends by interlocking projections and depressions, said guard section being interiorly threaded from its outer toward its inner end, and being provided at its inner end with sockets for the reception of said projections on the boxing, an expanding cone reduced toward its inner end and having an exteriorly threaded extremity to fit in the threaded bore of the guard section, said expanding cone having its bore threaded near its outer end to engage the threads upon the exterior surface of the boxing, said threads in the bore of the cone being arranged upon a more abrupt pitch than those upon the exterior surface of its inner end, whereby when the cone is turned independently of the boxing and the guard section the boxing is drawn outward more rapidly than the cone is fed into the guard section, whereby the projections at the inner end of the boxing are drawn firmly into the sockets in the inner end of the guard section, spokes fitted in the sockets of the socket ring, a ring 17 threaded exteriorly upon the enlarged portion of the cone to close the outer sides of the spoke sockets, and a guard threaded upon the extremity of the boxing and bearing at its inner end upon the outer surface of said ring, substantially as specified.

In testimony that I claim the foregoing as my own I have hereto affixed my signature in the presence of two witnesses.

CHARLES O. METZLER.

Witnesses:
W. L. CHRISTIAN,
B. F. METZLER.